United States Patent
Yamadaya (10) Patent No.: US 9,048,686 B2
(45) Date of Patent: Jun. 2, 2015

(54) POWER SUPPLY SYSTEM, CONTROLLER THEREFOR, AND METHOD OF MANUFACTURE OF CONTROLLER

(75) Inventor: Masayuki Yamadaya, Matsumoto (JP)

(73) Assignee: FUJI ELECTRIC CO., LTD., Kawasaki-shi (JP)

( * ) Notice: Subject to any disclaimer, the term of this patent is extended or adjusted under 35 U.S.C. 154(b) by 199 days.

(21) Appl. No.: 13/383,526

(22) PCT Filed: Sep. 29, 2010

(86) PCT No.: PCT/JP2010/005843
§ 371 (c)(1),
(2), (4) Date: Mar. 29, 2012

(87) PCT Pub. No.: WO2011/040005
PCT Pub. Date: Apr. 7, 2011

(65) Prior Publication Data
US 2012/0176114 A1   Jul. 12, 2012

(30) Foreign Application Priority Data
Sep. 30, 2009   (JP) ................. 2009-228067

(51) Int. Cl.
*H02M 1/084* (2006.01)
*H02J 1/10* (2006.01)
(Continued)

(52) U.S. Cl.
CPC ............ *H02J 1/102* (2013.01); *H02M 1/084* (2013.01); *H02M 2003/1586* (2013.01); *H02J 1/14* (2013.01); *H02M 3/1584* (2013.01)

(58) Field of Classification Search
CPC ............. H02M 1/084; H02M 1/0845; H02M 2001/0054
USPC ....................................................... 323/272
See application file for complete search history.

(56) References Cited

U.S. PATENT DOCUMENTS

| | | | |
|---|---|---|---|
| 2008/0197823 A1* | 8/2008 | Crowther et al. | ............. 323/271 |
| 2008/0238390 A1 | 10/2008 | Trivedi et al. | |

(Continued)

FOREIGN PATENT DOCUMENTS

| | | |
|---|---|---|
| JP | 11-127573 A | 5/1999 |
| JP | 2007-104834 A | 4/2007 |

(Continued)

OTHER PUBLICATIONS

Qiu, Weihong; Power Loss Analyses for Dynamic Phase Number Control in Multiphase Voltage Regulators, Feb. 19, 2009, APEC 2009, pp. 102-108.*

*Primary Examiner* — Harry Behm
(74) *Attorney, Agent, or Firm* — Rabin & Berdo, P.C.

(57) ABSTRACT

A power supply system of the present invention aims to achieve optimization of the efficiency and therefore includes: z (z is a natural number equal to or larger than 2) power supplies (PS-1 to PS-z) connected in parallel; and a controller (8) for the number of power supplies in operation which controls the number of power supplies in operation among the power supplies (PS-1 to PS-z). The controller (8) for the number of power supplies in operation determines the number of the power supplies in operation based on values of intersection currents $i_1$ to $i_{(z-1)}$ which are determined through processes of: identifying output loss characteristics with respect to load currents of the z power supplies (PS-1 to PS-z) by use of convex functions f1 to fz, respectively; obtaining a function $h_n$ expressing a conversion efficiency of a total load current at the time of operating the n (n is a natural number equal to or smaller than z) power supplies (PS-1 to PS-z) based on the functions f1 to fz; and obtaining an intersection current $i_q$ (q is a natural number equal to or smaller than (z−1)) which is a current of an intersection point between a function $h_q$ and a function $h_{(q+1)}$. (Greek letter eta is replaced with h.)

22 Claims, 5 Drawing Sheets

(51) Int. Cl.
*H02J 1/14* (2006.01)
*H02M 3/158* (2006.01)

(56) References Cited

U.S. PATENT DOCUMENTS

2009/0179619 A1* 7/2009 Houston ............... 323/212
2009/0224731 A1* 9/2009 Tang et al. ............ 323/241

FOREIGN PATENT DOCUMENTS

| | | |
|---|---|---|
| JP | 2007-116834 A | 5/2007 |
| JP | 2007-143292 A | 6/2007 |
| JP | 2007-325446 A | 12/2007 |
| JP | 2008-187865 A | 8/2008 |
| JP | 2008-263771 A | 10/2008 |
| JP | 2009-159691 A | 7/2009 |

* cited by examiner

POWER SUPPLY SYSTEM, CONTROLLER THEREFOR, AND METHOD OF MANUFACTURE OF CONTROLLER

TECHNICAL FIELD

The present invention relates to a power supply system, a controller for the power supply system, and a method of manufacturing the controller, the power supply system including multiple power supplies connected in parallel.

BACKGROUND ART

The power supply system including multiple power supplies connected in parallel requires balancing of load currents in the power supplies in operation. In this respect, many proposals have been made for methods of balancing the load currents (For example, see Patent Literature 1 and 2).

In addition, Patent Literature 3 and 4 disclose power supply systems in which the number of power supplies in operation is changed depending on the load current so as to enhance conversion efficiency.

In these power supply systems, a load current $I_{TOTAL}$ of a power supply system is divided by a maximum rated current $I_{OMAX}$ in individual power supplies, the result of the division is rounded up, and the value thus obtained is determined as the number of required power supplies in operation. According to this scheme, when the load current (an average value) of the power supplies in operation reaches the maximum rated current $I_{OMAX}$, the number of power supplies in operation is increased by one.

CITATION LIST

Patent Literature

PTL 1: Japanese Patent Application Publication No. 2007-104834
PTL 2: Japanese Patent Application Publication No. 2007-143292
PTL 3: Japanese Patent Application Publication No. Hei 11-127573
PTL 4: Japanese Patent Application Publication No. 2009-159691

SUMMARY OF INVENTION

Technical Problem

The maximum rated current ($I_{OMAX}$) described above is a value corresponding to the highest conversion efficiency in the individual power supplies (in the case of Patent Document 4, see FIG. 7), or if not, is a value corresponding to a high conversion efficiency close to the highest.

In the conventional scheme of the power supply system, as soon as the load current (average value) of power supplies in operation reaches the maximum rated current ($I_{OMAX}$), the number of power supplies in operation is increased by one. In this scheme, the conversion efficiency of each power supply is lowered, that is, the conversion efficiency of the power supply system is lowered, as the number of power supplies in operation increases. As described above, the conventional power supply system has a problem that the conversion efficiency is lowered when the number of power supplies in operation is changed.

Under these circumstances, an object of the present invention is to provide a power supply system, a controller thereof and a method of manufacturing the controller which are capable of changing the number of power supplies without lowering the efficiency.

Solution to Problem

To solve the above problem, the present invention includes: z (z is a natural number equal to or larger than 2) power supplies connected in parallel; and an operating number controller which controls the number of the power supplies in operation. The operating number controller is configured to determine the number of the power supplies in operation based on intersection currents $i_1$ to $i_{(z-1)}$ which are determined through processes of: identifying loss characteristics with respect to load currents of the z power supplies by use of respective convex functions f1 to fz; obtaining a function $h_n$ expressing a conversion efficiency of a total load current at the time of operating the n (n is a natural number equal to or smaller than z) power supplies based on the functions f1 to fz; and obtaining an intersection current $i_q$ (q is a natural number equal to or smaller than (z−1)) which is a current of an intersection point between a function $h_q$ and a function $h_{(q+1)}$. (Greek letter eta is replaced with h.)

The operating number controller includes, for example, an intersection-current-value storage element which saves the intersection currents $i_1$ to $i_{(z-1)}$ and a current detection element which detects the total load current. The operating number controller determines the number of the power supplies in operation by comparing the total load current detected by the current detection element with a corresponding one of the intersection currents $i_1$ to $i_{(z-1)}$ saved in the intersection-current-value storage element.

The operating number controller is, for example, configured to determine the number of power supplies in operation as: 1 in a case of $i<i_1$; q+1 in a case of $$i_q < i \le i_{(q-1)};$$ [Math.0-1]

or z in a case of $i_{(z-1)} < i$, or determines the number of power supplies in operation as: 1 in a case of $$i \le i_1;$$ [Math.0-2]

q+1 in a case of $$i_q \le i \le i_{(q+1)};$$ [Math.0-3]

or z in a case of $$i_{(z-1)} \le i,$$ [Math.0-4]

where i denotes the total load current detected by the current detection element.

The operating number controller may include: a threshold generation element which outputs, based on a corresponding one of the intersection currents $i_1$ to $i_{(z-1)}$, a threshold $i_{jL}=i_{(j-1)}/j$ for decreasing the number of power supplies in operation (j is a natural number of 2 to (z−1)), a threshold $i_{jH}=i_j/j$ for increasing the number of power supplies in operation, a threshold $i_{1H}=i_1$ for increasing the number of power supplies in operation or a threshold $i_{zL}=i_{(z-1)}/z$ for decreasing the number of power supplies in operation (provided that $i_{1L}$ does not exist or is zero, and $i_{zH}$ does not exist or is a value exceeding a maximum value in each of allowable load currents of the z power supplies); a number storage element which stores the number n of the power supplies in operation; and a current detection element which detects a load current of one of the power supplies in operation. The operating number controller compares a value of the load current detected by the current detection element with the threshold $i_{nL}$ or $i_{nH}$. When the value of the load current detected by the current detection element is equal to or lower than the threshold $i_{nL}$, the operating number controller changes the number of the power supplies in operation to (n−1), or when the load current detected by the current detection element is equal to or higher than the threshold $i_{nH}$, the operating number controller changes the number of the power supplies in operation to (n+1).

The convex functions f1 to fz are, for example, each an even-ordered polynomial with respect to the total load current. The convex functions f1 to fz are each substantially equal to a single quadratic, $$P_L = a i_m^2 + b i_m + c \quad \text{[Math.1]}$$

where $P_L$ denotes a loss of a load current $i_m$ of a power supply, a, b and c are constants, the threshold $i_{nL}$ is obtained by replacing z in the following expression with z=(n−1), and the threshold $i_{nH}$ is obtained by replacing z in the following expression with z=(n+1),

[Math. 2]

$$\sqrt{\frac{c}{a}\frac{z}{n}}$$

All of the convex functions f1 to fz are, for example, substantially equal to a single quadratic polynomial with respect to the load current. In this case, the operating number controller may include: a number storage element which stores the number n of the power supplies in operation; a current detection element which detects a load current of one of the power supplies in operation; a square element which squares an output signal of the current detection element; and threshold generation elements which respectively give a threshold $V_{thL}=K*((n-1)/n)$ for decreasing the number of power supplies in operation (K is a positive constant) and a threshold $V_{thH}=K*((n+1)/n)$ for increasing the number of power supplies in operation. The operating number controller decreases or increases the number n of the power supplies in operation by comparing the output of the square element with a threshold $V_{thL}$ or a threshold $V_{thH}$.

The threshold generation elements may include non-inverting amplifier circuits each including: an operational amplifier; a constant voltage source which applies a constant voltage to a non-inverting input terminal of the operational amplifier; a fixed resistor which is connected between an output terminal of the operational amplifier and an inverting input terminal thereof and which has a resistance Rd; and a variable resistor circuit which is connected between the inverting input terminal of the operational amplifier and a reference potential point and which changes a resistance based on the number n of power supplies in operation.

In the each of the non-inverting amplifier circuits, the variable resistor circuit is formed as a serial circuit including a resistor which has one end connected to the output terminal of the operational amplifier and which has a resistance Rd and resistors which have a resistance (n−1)*Rd based on the number n of power supplies in operation, the threshold $V_{thH}$ for increasing the number of power supplies in operation is outputted from the output terminal of the operational amplifier, and a potential at a connection point between the resistor having the resistance Rd and the resistors having the resistance (n−1)*Rd is outputted as the threshold $V_{thL}$ for decreasing the number of power supplies in operation.

The variable resistor circuit of the each of the non-inverting amplifier circuit is configured to include: z resistors connected in series between the inverting input terminal of the operational amplifier and the reference potential point and which have a resistance Rd; (z−1) switching elements which change the number of the resistors connected in series in the serial circuit having the z resistors; and a decoder which controls turning-on and turning-off of the (z−1) switching elements on a basis of the number n of power supplies in operation, thereby forming the serial circuit including the resistor having the resistance Rd and the resistors having the resistance (n−1)*Rd.

The operating number controller may be configured to provide a maximum hysteresis error to the intersection currents or the thresholds based on the intersection currents in order to determine the number of the power supplies in operation.

The operating number controller may be configured to prohibit changing of the number of the power supplies in operation for a predetermined time after the number of the power supplies in operation is changed. Step-down type switching power supplies are, for example, used for the power supplies.

The present invention also provides a controller in a power supply system including z (z is a natural number equal to or larger than 2) power supplies connected in parallel. The controller is configured to determine the number of the power supplies in operation based on values of intersection currents $i_1$ to $i_{(z-1)}$ which are determined through processes of: identifying loss characteristics with respect to load currents of the z power supplies by use of respective convex functions f1 to fz; obtaining a function $h_n$ expressing a conversion efficiency of a total load current at the time of operating the n (n is a natural number equal to or smaller than z) power supplies based on the functions f1 to fz; and obtaining an intersection current $i_q$ (q is a natural number equal to or smaller than (z−1)) which is a current of an intersection point between a function $h_q$ and a function $h_{(q+1)}$. (Greek letter eta is replaced with h.)

The controller may include an intersection-current-value storage element which saves the values of the intersection currents $i_1$ to $i_{(z-1)}$ and a current detection element which detects the total load current. In this case, the number of the power supplies in operation is determined by comparing the total load current detected by the current detection element with a corresponding one of the intersection currents $i_1$ to $i_{(z-1)}$ saved in the intersection-current-value storage element.

The controller is configured to determine the number of power supplies in operation as: 1 in a case of $i<i_1$; q+1 in a case of $$i_q < i \le i_{(q-1)}, \quad \text{[Math.0-1]}$$

or z in a case of $i_{(z-1)}<i$; or determines the number of power supplies in operation as: 1 in a case of $$i \le i_1; \quad \text{[Math.0-2]}$$

q+1 in a case of $$i_q \le i < i_{(q+1)}; \quad \text{[Math.0-3]}$$

or z in a case of $$i_{(z-1)} \le i; \quad \text{[Math.0-4]}$$

where i denotes the total load current detected by the current detection element.

The controller may include: a threshold generation element which outputs, based on a corresponding one of the intersection currents $i_1$ to $i_{(z-1)}$, a threshold $i_{jL}=i_{(j-1)}/j$ for decreasing the number of power supplies in operation (j is a natural number of 2 to (z−1)), a threshold $i_{jH}=i_j/j$ for increasing the number of power supplies in operation, a threshold $i_{1H}=i_1$ for increasing the number of power supplies in operation or a threshold $i_{zL}=i_{(z-1)}/z$ for decreasing the number of power supplies in operation (provided that $i_{1L}$ does not exist or is zero, and $i_{zH}$ does not exist or is a value exceeding a maximum value in each of allowable load currents of the z power supplies); a number storage element which stores the number n of the power supplies in operation; and a current detection element which detects a load current of one of the power supplies in operation. The controller compares a value of the load current detected by the current detection element with a threshold $i_{nL}$ or $i_{nH}$, and when the value of the load current detected by the current detection element is equal to or lower than the threshold $i_{nL}$, the controller changes the number of the power supplies in operation to (n−1), or when the load current detected by the current detection element is equal to or higher than the threshold $i_{nH}$, the controller changes the number of the power supplies in operation to (n+1).

The convex functions f1 to fz are, for example, each is an even-ordered polynomial with respect to the total load current.

The convex functions f1 to fz are, for example, each substantially equal to a single quadratic, $$P_L = ai_m^2 + bi_m + c \quad [\text{Math.3}]$$

where $P_L$ denotes a loss of a load current $i_m$ of a power supply, and a, b and c are constants, the threshold $i_{nL}$ is obtained by replacing z in the following expression with z=(n−1), and the threshold $i_{nH}$ is obtained by replacing z in the following expression with z=(n+1),

[Math. 4]
$$\sqrt{\frac{c}{a}\frac{z}{n}}$$

All of the convex functions f1 to fz are, for example, substantially equal to a single quadratic polynomial with respect to the load current. In this case, the controller includes: a number storage element which stores the number n of the power supplies in operation; a current detection element which detects a load current of one of the power supplies in operation and outputs a voltage signal corresponding to the load current; a square element which squares the output signal of the current detection element; and threshold generation elements which respectively give a threshold $V_{thL}=K*((n-1)/n)$ for decreasing the number of power supplies in operation (K is a positive constant) and a threshold $V_{thH}=K*((n+1)/n)$ for increasing the number of power supplies in operation. The controller decreases or increases the number n of the power supplies in operation by comparing the output of the square element with a threshold $V_{thL}$ or a threshold $V_{thH}$.

The threshold generation elements, for example, include non-inverting amplifier circuits each including: an operational amplifier, a constant voltage source which applies a constant voltage to a non-inverting input terminal of the operational amplifier; a fixed resistor which is connected between an output terminal of the operational amplifier and an inverting input terminal thereof and which has a resistance Rd; and a variable resistor circuit which is connected between the inverting input terminal of the operational amplifier and a reference potential point and which changes a resistance based on the number n of power supplies in operation. In each of the non-inverting amplifier circuits, the variable resistor circuit is formed as a serial circuit including a resistor which has one end connected to the output terminal of the operational amplifier and which has a resistance Rd and resistors which have a resistance (n−1)*Rd based on the number n of power supplies in operation, the threshold $V_{thH}$ for increasing the number of power supplies in operation is outputted from the output terminal of the operational amplifier, and a potential at a connection point between the resistor having the resistance Rd and the resistors having the resistance (n−1)*Rd is outputted as the threshold $V_{thL}$ for decreasing the number of power supplies in operation.

The variable resistor circuit of each of the non-inverting amplifier circuits, for example, includes: z resistors connected in series between the inverting input terminal of the operational amplifier and the reference potential point and which have a resistance Rd; (z−1) switching elements which change the number of the resistors connected in series in the serial circuit having the z resistors; and a decoder which controls turning-on and turning-off of the (z−1) switching elements on a basis of the number n of power supplies in operation, thereby forming the serial circuit including the resistor having the resistance Rd and the resistors having the resistance (n−1)*Rd.

The controller may be configured to provide a maximum hysteresis error to the intersection currents or the thresholds based on the intersection currents in order to determine the number of the power supplies in operation. The number of the power supplies in operation may be prohibited for a predetermined time after the number of the power supplies in operation is changed. Step-down type switching power supplies are, for example, used for the switching power supplies.

The present invention also provides a method of manufacturing a controller of a power supply system which operates z (z is a natural number equal to or larger than 2) power supplies PS-1 to PS-z in parallel. The method includes the steps of: storing, in a storage element, a value of an intersection current $i_q$ (q is a natural number equal to or smaller than (z−1)) or a value obtained by performing a predetermined arithmetic operation on the intersection current $i_q$, the value of the intersection current $i_q$ being obtained through processes of identifying loss characteristics with respect to load currents of the z power supplies PS-1 to PS-z by use of respective convex functions f1 to fz, obtaining a function $h_n$ expressing a conversion efficiency of a total load current at the time of operating the n (n is a natural number equal to or smaller than z) power supplies in parallel based on the functions f1 to fz, and obtaining the intersection current $i_q$ (q is a natural number equal to or smaller than (z−1)) which is a current at an intersection point between a function $h_q$ and a function $h_{(q+1)}$; and providing a control element which determines the number of the power supplies in operation based on the value stored in the storage element. (Greek letter eta is replaced with h.)

The present invention also provides a method of manufacturing a controller of a power supply system including z (z is a natural number equal to or larger than 2) power supplies PS-1 to PS-z in parallel operation. The method includes the steps of: obtaining a threshold for changing the number of the power supplies in operation between n and (n+1) by the following Equation (1) or (2) derived by identifying loss characteristics with respect to load currents of the z power supplies PS-1 to PS-z by use of respective convex functions f1 to fz,

[Math. 5]

$$I_{th\_z} = \sqrt{\frac{c}{a}n(n+1)} \quad (1)$$

$$I_{mth\_z} = \frac{I_{th\_z}}{z} = \sqrt{\frac{c}{a}\frac{n+1}{n}} \quad (2)$$

where a and c are constants; storing the threshold in a storage element; and providing a control element which determines the number of the power supplies in operation based on the threshold stored in the storage element.

The present invention also provides a method of manufacturing a controller of a power supply system which operates z (z is a natural number equal to or larger than 2) power supplies PS-1 to PS-z in parallel. The method includes the steps of: identifying loss characteristics with respect to load currents i of the z power supplies PS-1 to PS-z by use of a single quadratic $ai^2+bi+c$; calculating c/a; storing a value proportional to c/a in a storage element of the controller of the power supply system, or adjusting an output voltage of a reference voltage source to a value proportional to c/a, the reference voltage source being included in the controller of the power supply system; and determining the number of the power supplies in operation based on the value proportional to c/a.

Advantageous Effect of Invention

According to the present invention, it is possible to achieve optimization of the efficiency by changing the number of power supplies in operation without lowering the efficiency, thus obtaining high practicability and economic efficiency.

DESCRIPTION OF EMBODIMENT

Figure 1:
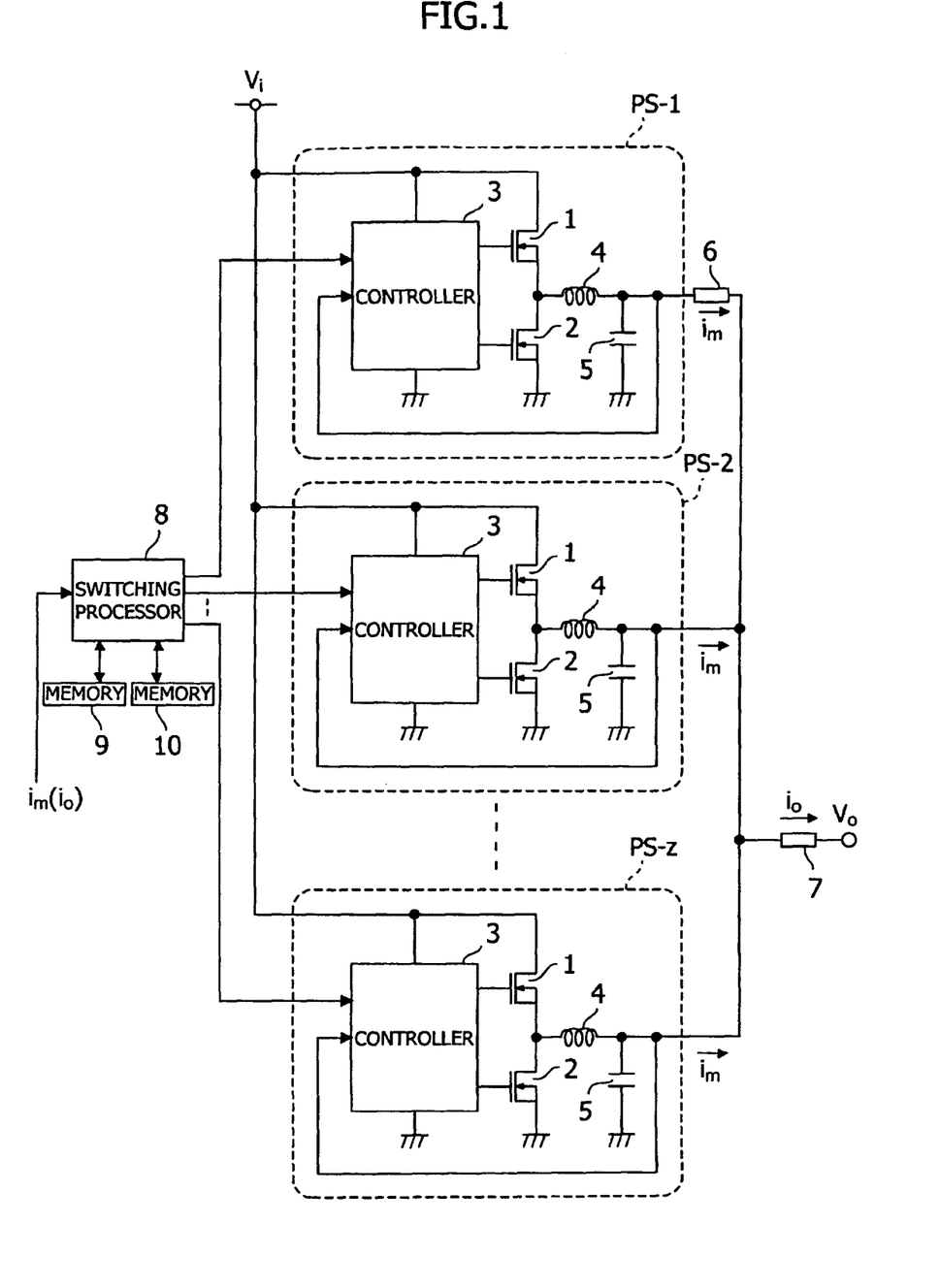
FIG. 1 is a block diagram showing one embodiment of a power supply system according to the present invention.

FIG. 1 shows an embodiment of a power supply system according to the present invention. The power supply system has a configuration in which multiple switching power supplies PS (PS-1 to PS-k) are connected in parallel.

Each switching power supply PS includes: a step-down type DC-DC converter having: MOSFETs 1 and 2; a controller 3 that performs a switching operation on the MOSFETs 1 and 2 by using a modulation signal such as a PWM signal; an inductor 4 for smoothing; and a capacitor 5. The power supply PS converts a direct current input voltage $V_i$ into a direct current output voltage $V_o$ by switching the MOSFETs 1 and 2 on and off.

Note that load currents $i_m$ in the switching power supplies PS described above are balanced. Since a technique for balancing the load currents $i_m$ is made known publicly by Patent Literature 1 and 2 and the like, description thereof is omitted herein.

A loss of the switching power supply PS generally includes the following elements:
1) a direct current loss ($P_{Ldc}$) of the inductor 4;
2) an alternate current loss ($P_{Lac}$) of the inductor 4;
3) a gate charge loss ($P_{Qg}$) of the MOSFETs 1 and 2;
4) a junction capacitance loss ($P_{QDS}$) of the MOSFETs 1 and 2;
5) a conduction loss ($P_{ONH}$) of the MOSFET 1;
6) a conduction loss ($P_{ONL}$) of the MOSFET 2;
7) a conduction loss ($P_{BDI}$) of a body diode (unillustrated) of the MOSFET 2;
8) a turn-on and turn-off loss ($P_{SW}$) of the MOSFET 1; and
9) power consumption ($P_{CTRL}$) of the controller 3.

The direct current loss $P_{Ldc}$ of the inductor 4 is given by the following Equation (1),

[Math. 6]

$$P_{Ldc} = R_{Ldc} \cdot i_m^2 \quad (1)$$

where $R_{Ldc}$ denotes a direct current resistance of the inductor 4, and $i_m$ denotes a load current outputted from a single switching power supply PS.

In addition, the alternate current loss $P_{Lac}$ of the inductor 4 is given by the following Equation (2),

[Math. 7-1]

$$\begin{aligned} P_{Lac} &= R_{Lac} \cdot I_{Lac}^2 \\ &= R_{Lac} \cdot \left(\frac{1}{2\sqrt{3}}\Delta I_L\right)^2 \\ &= \frac{R_{Lac}}{12} \cdot \left(\frac{V_i - V_o}{L} \cdot \frac{V_o}{V_i} \cdot \frac{1}{f}\right)^2 \end{aligned} \quad (2)$$

where $R_{Lac}$ denotes an alternate current resistance of the inductor 4; $I_{Lac}$ denotes an alternate current of the inductor 4 expressed by the following equation (3);

[Math. 7-2]

$$I_{Lac} = \frac{1}{2\sqrt{3}}\Delta I_L \quad (3)$$

(Greek letter delta is replaced with D.)
$DI_L$ denotes a ripple current of the inductor 4 expressed by the following equation (4);

[Math. 7-3]

$$\Delta I_L = \frac{V_i - V_o}{L} \cdot \frac{V_o}{V_i} \cdot \frac{1}{f} \quad (4)$$

$V_i$ denotes a supply voltage; $V_o$ denotes an input voltage of the switching power supply PS; L denotes an inductance of the inductor 4; and f denotes a switching frequency.

The gate charge loss $P_{Qg}$ of the MOSFETs 1 and 2 is expressed as in the following Equation (5),

[Math.8]

$$P_{Qg} = (Q_{gL} \cdot V_{gL} + Q_{gH} \cdot V_{gH}) \cdot f \quad (5)$$

where $Q_{gL}$ denotes a gate charge of the MOSFET 2; $Q_{gH}$ denotes a gate charge of the MOSFET 1; $V_{gL}$ denotes a gate operating voltage of the MOSFET 2; and $V_{gH}$ denotes a gate operating voltage of the MOSFET 1.

In addition, the junction capacitance loss $P_{QDS}$ of the MOSFETs 1 and 2 is expressed as in the following Equation (6),

[Math. 9]

$$P_{QDS} = \frac{1}{2}(C_{DSL} + C_{DSH}) \cdot V_i^2 \cdot f \quad (6)$$

where $C_{DSL}$ denotes a junction capacitance of the MOSFET 2; and $C_{DSH}$ denotes a junction capacitance of the MOSFET 1.

The conduction loss $P_{ONH}$ of the MOSFET 1 is given by the following Equation (7),

[Math. 10-1]

$$P_{ONH} = \frac{V_o}{V_i} \cdot R_{ONH} \cdot \frac{(I_{peak}^2 + I_{bottom}^2 + I_{peak} \cdot I_{bottom})}{3} \quad (7)$$
$$= \frac{V_o}{V_i} \cdot R_{ONH} \cdot \left(i_m^2 + \frac{\Delta I_L^2}{12}\right)$$

where $R_{ONH}$ denotes an ON resistance of the MOSFET 1; $I_{peak}$ denotes a peak current of the inductor 4 expressed by the following equation (8); and

[Math. 10-2]

$$I_{peak} = i_m + \frac{\Delta I_L}{2} \quad (8)$$

$I_{bottom}$ denotes a bottom current of the inductor 4 expressed by the following equation (9),

[Math. 10-3]

$$I_{bottom} = i_m - \frac{\Delta I_L}{2} \quad (9)$$

The conduction loss $P_{ONL}$ of the MOSFET 2 is given by the following Equation (10),

[Math. 11]

$$P_{ONL} = \left(1 - \frac{V_o}{V_i} - 2t_d \cdot f\right) \cdot R_{ONL} \cdot \quad (10)$$
$$\frac{(I_{peak}^2 + I_{bottom}^2 + I_{peak} \cdot I_{bottom})}{3}$$
$$= \left(1 - \frac{V_o}{V_i} - 2t_d \cdot f\right) \cdot R_{ONL} \cdot \left(i_m^2 + \frac{\Delta I_L^2}{12}\right)$$

where $R_{ONL}$ denotes an ON resistance of the MOSFET 2; and $t_d$ denotes a dead time of the MOSFET 1 and the MOSFET 2.

The conduction loss $P_{BDI}$ of the body diode of the MOSFET 2 is given by the following Equation (11),

[Math. 12]

$$P_{BDI} = t_d \cdot f \cdot (V_F \cdot I_{peak} + V_F \cdot I_{bottom}) \quad (11)$$
$$= 2t_d \cdot f \cdot V_P \cdot i_m$$

where $V_F$ denotes a forward vias voltage of the body diode of the MOSFET 2.

The turn-on and turn-off loss $P_{SW}$ of the MOSFET 1 is expressed as in the following Equation (12),

[Math. 13]

$$P_{SW} = \frac{1}{2} \cdot V_i (I_{peak} \cdot t_f + I_{bottom} \cdot t_r) \cdot f \quad (12)$$
$$= \frac{1}{2} \cdot V_i \cdot f \cdot \left\{(t_f + t_r) \cdot i_m + \frac{(t_f - t_r)}{2} \Delta I_L\right\}$$

where $t_r$ denotes a rise time at the time of switching-on the MOSFET 1; and $t_f$ denotes a fall time at the time of switching-off the MOSFET 2.

The power consumption $P_{CTRL}$ of the controller 3 is expressed as follows,

[Math.14]

$$P_{CTRL} = V_i \cdot I_{CC} \quad (13)$$

where $I_{CC}$ denotes a supply current to the controller 3.

A total power loss $P_L$ at each switching power supply PS is calculated by adding the aforementioned power loss elements.

When the input voltage $V_i$, the output voltage $V_o$ and the switching frequency f at the switching power supply PS are fixed, the power loss $P_{Ldc}$ in Equation (1), the conduction loss $P_{ONH}$ in Equation (7) and the conduction loss $P_{ONL}$ in Equation (10) become a quadric for the load current $i_m$. In addition, the power loss $P_{BDI}$ in Equation (11), and the turn-on and turn-off loss $P_{SW}$ in Equation (12) become a linear function for the load current $i_m$, and the other power losses become a constant value.

Accordingly, the total power loss $P_L$ is approximately expressed by the quadric for the load current $i_m$ as follows ("approximately" means that an influence of a parasitic element or the like is ignored),

[Math. 15]

$$P_L = (P_{Ldc} + P_{ONH} + P_{ONL}) + (P_{BDI} + P_{SW}) + \\ P_{Lac} + P_{Qg} + P_{QDS} + P_{CTRL} \quad (14)$$

$$= a i_m^2 + b i_m + c \quad (15)$$

Figure 4:
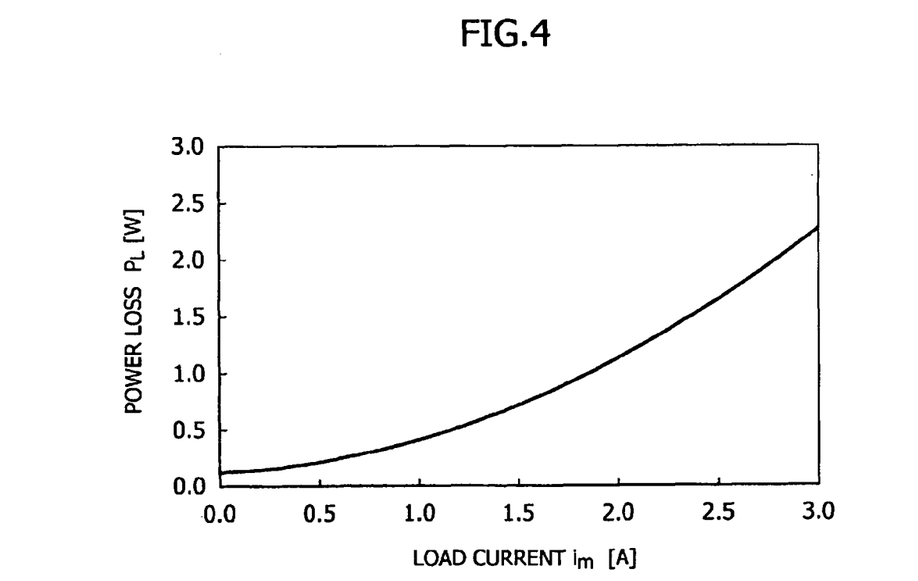
FIG. 4 is a graph exemplary illustrating a relationship between a load current and a power loss of a switching power supply.

Coefficients a, b and c in Expression (15) can be obtained by substituting Expressions (1) to (13) to Expression (14). FIG. 4 illustrates the total power loss $P_L$ approximately expressed by the quadric as described above. Although a detailed description is omitted here, FIG. 4 shows the total power loss $P_L$ which well matches the experimental result.

The above is a technique in which the characteristic of the total power loss $P_L$ is logically approximated by the function. Alternatively, it is possible to obtain the relationship between the load current $i_m$ and the total power loss $P_L$ by using experiments, and then to approximate the characteristic by any appropriate function on the basis of a numerical analysis (for example, polynomial regression).

Figure 5:
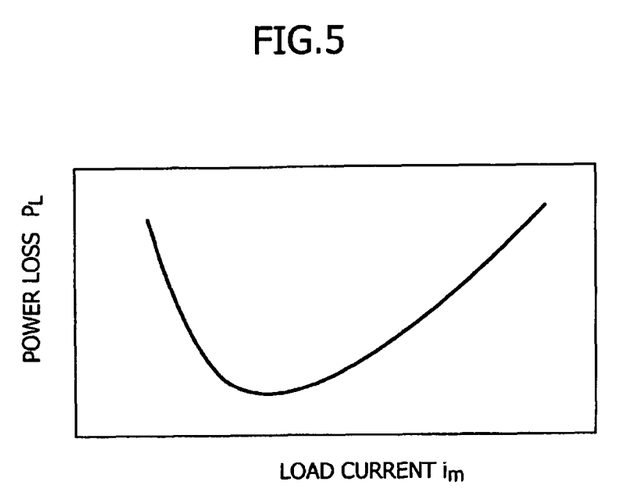
FIG. 5 is a graph showing an example of a convex function.

In this case, however, the function used for the approximation might be not only a quadratic function but also a higher-order polynomial function, and any other more complicated function. This is because how parasitic elements (a resistance, a capacitance and an inductance) influence the loss of the switching power supply PS is unknown. However, even in this case, a (generalized) convex function is used. In other words, the function described above is never an odd-ordered polynomial function or the like. FIG. 5 shows an example of the (generalized) convex function.

In FIG. 1, when the number of the switching power supplies PS in an operating state is n, a total load current $i_o$ is expressed as in the following Equation (16). Note that the characteristics of the switching power supplies PS are herein equal to each other, or may be considered to be equal. In addition, since the power loss $P_L$ of each switching power supply PS is expressed by Expression (15), a power conversion efficiency (hereinafter, simply referred to as an efficiency) $h_n(i_o)$ of the power supply system is expressed by the following Equation (17), (Greek letter eta is replaced with h.)

[Math. 16]

$$i_o = n \cdot i_m \quad (16)$$

$$\eta_n(i_o) = \frac{v_o i_o}{v_o i_o + n \cdot p_L(i_m)} = \frac{v_o i_o}{\frac{a}{n} i_o^2 + (b + v_o) i_o + cn} \quad (17)$$

When the number of switching power supplies PS in operation is increased to n+1, the total load current $i_o$ is expressed as in the following Equation (18), and the efficiency $h_{n+1}(i_o)$ of the power supply system is expressed as in the following Equation (19), (Greek letter eta is replaced with h.)

[Math. 17]

$$i_o = (n+1) \cdot i_m \quad (18)$$

$$\eta_{n+1}(i_o) = \frac{v_o i_o}{v_o i_o + (n+1) \cdot p_L(i_m)} \quad (19)$$

$$= \frac{v_o i_o}{\frac{a}{n+1} i_o^2 + (b + v_o) i_o + c(n+1)}$$

Figure 6:
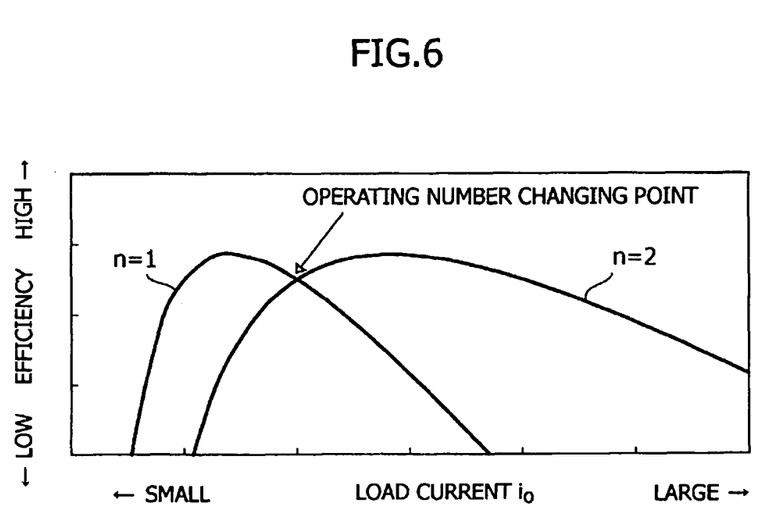
FIG. 6 is a graph illustrating a point of changing the number of switching power supplies in operation and the efficiency characteristics in a case of increasing the number of switching power supplies in operation from n=1 to n=2.

In the power supply system in this embodiment, when the total load current $i_o$ increases and the efficiency of the power supply system exceeds the peak, the efficiency is lowered. However, the lowering of the efficiency can be checked by increasing the number of switching power supplies PS in parallel operation, and thus the efficiency of the power supply system can be enhanced. Specifically, as FIG. 6 illustrates the efficiency characteristics at the time of n=1 and n=2, the increasing of the number of switching power supplies PS in operation (changing from n=1 to n=2) enhances the efficiency of the power supply system in a region having a large total load current $i_o$.

In this embodiment, the number of switching power supplies PS in operation is changed based on a threshold $i_{th\_n}$ of the total load current $i_o$. The threshold $i_{th\_n}$ is a value of the total load current $i_o$ obtained when the efficiencies shown by Equation (17) and Equation (19) are equal to each other, that is, when relationships shown by the following Equations (20) and (21) are fulfilled (in the example in FIG. 6, a value of the total load current $i_o$ at the intersection of the efficiency characteristics),

[Math. 18]

$$\eta_n(I_{th\_n}) = \eta_{n+1}(I_{th\_n}) \quad (20)$$

$$\frac{v_o I_{th\_n}}{\frac{a}{n} I_{th\_n}^2 + (b + v_o) I_{th\_n} + cn} = \frac{v_o I_{th\_n}}{\frac{a}{n+1} I_{th\_n}^2 + (b + v_o) I_{th\_n} + c(n+1)} \quad (21)$$

From the above, the threshold $i_{th\_n}$ of the total load current $i_o$, which is an index for changing the number of switching power supplies PS in parallel operation, is shown by the following Equation (22),

[Math. 19]

$$I_{th\_n} = \sqrt{\frac{c}{a} n(n+1)} \quad (22)$$

The total load current $i_o$ is shared based on the number n of switching power supplies PS in parallel operation. Thus, the threshold $I_{mth\_n}$ of the load current $i_m$ per switching power supply PS is shown by the following Equation (23),

[Math. 20]

$$I_{mth\_n} = \frac{I_{th\_n}}{n} = \sqrt{\frac{c}{a} \frac{n+1}{n}} \quad (23)$$

Consequently, the efficiency of the power supply system can be optimized by changing the number of parallel connections of the switching power supplies PS (the number of switching power supplies PS in parallel operation) from n to n+1 when the load current $i_m$ of any of the switching power supplies PS in operation reaches the threshold $I_{mth\_n}$.

In contrast, a threshold for changing the number of switching power supplies PS in parallel operation from n to n−1 is obtained by replacing n in Equation (23) with n−1 and further by multiplying the calculation result by (n−1)/n. This is because simply replacing n in Equation (23) with n−1 leads to obtain, as a threshold for the timing of changing between (n−1) and n, a current which is required when the total load current $i_o$ is shared with the (n−1) switching power supplies PS. In this respect, the calculation of multiplying (n−1)/n is performed for a conversion into a current required when the total load current $i_o$ is shared with the n switching power supplies PS. Thereby, (n+1)/n in the root in Equation (23) is replaced with (n−1)/n.

Incidentally, when the input voltage $V_i$ and the output voltage $V_o$ are constant, c/a in Equations (22) and (23) can be considered to be a constant value.

In the power supply system, any one of the switching power supplies PS-1 to PS-k, for example, a switching power supply PS-1 is selected as a master power supply, and a load current $i_m$ of this switching power supply PS-1 is detected by a current sensor 6. The current sensor 6 includes, for example, a current-sensing resister, a current transformer and the like, and outputs a signal corresponding to the detected load current $i_m$ to a changing processor 8.

Figure 2:
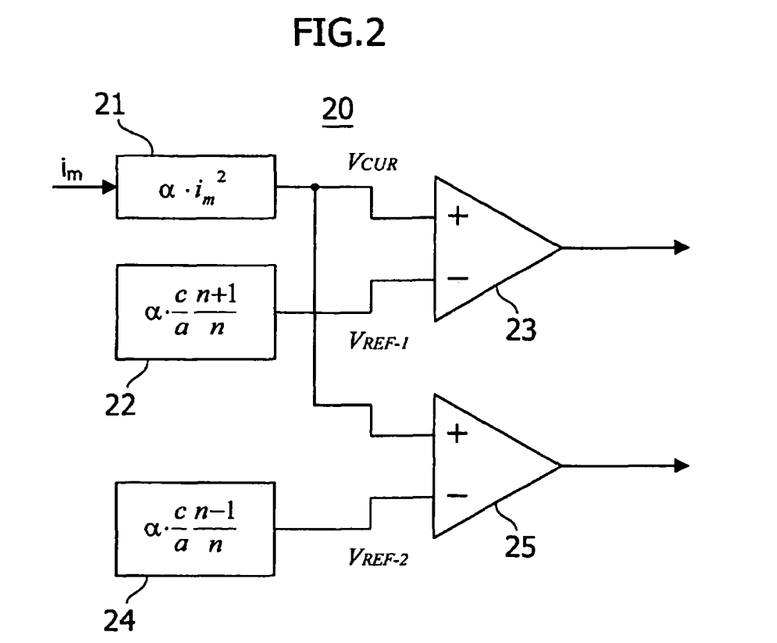
FIG. 2 is a block diagram showing an example of a configuration of an intersection current detector.

The changing processor 8 includes an intersection current detector 20 shown in FIG. 2. In the intersection current detector 20, a voltage generator 21 computes $a*i_m^2$ based on the load current $i_m$ detected by the current sensor 6, and generates a voltage $V_{CUR}$ corresponding to the thus computed $a*i_m^2$. (Greek letter alpha is replaced with A.)

Figure 3:
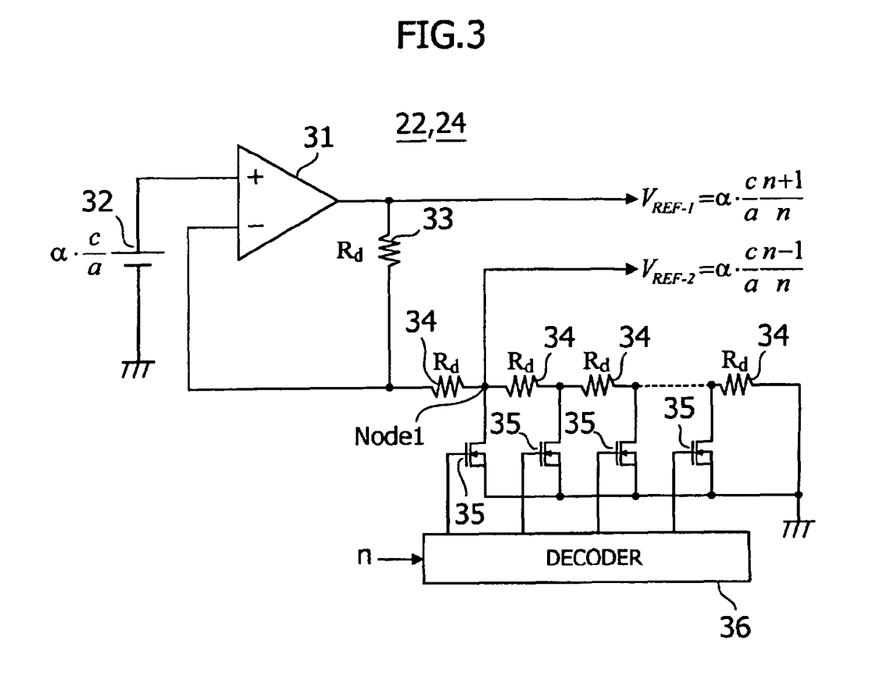
FIG. 3 is a circuit diagram showing an example of a configuration of reference voltage generators 22 and 24.

Threshold generators 22 and 24 are each formed of an inverting amplifier illustrated in FIG. 3. Specifically, the circuit in FIG. 3 includes an operational amplifier 31, a direct current source 32, a resistor 33 (having a resistance $R_d$), a serial circuit formed of z resistors 34 (each having a resistance $R_d$) (z is a total number of switching power supplies PS in the power supply system), (z−1) switching elements 35 and a decoder 36. The direct current source 32 inputs a voltage corresponding to $a*c/a$ to a non-inverting input terminal of the operational amplifier 31. The resistor 33 is connected between an inverting input terminal of the operational amplifier 31 and an output terminal thereof. The serial circuit is connected between the inverting input terminal of the operational amplifier 31 and a reference potential point (GND). The (z−1) switching elements 35 change the number of serially connected resistors 34 in the serial circuit. The decoder 36 selectively turns on or off a corresponding switching element 35 based on the number n of switching power supplies PS in operation.

Based on the number n of switching power supplies PS in parallel operation, the decoder 36 turns off (disconnects) the switching elements 35 from the leftmost one to the (n−1)th one in FIG. 3, and turns on (makes conductive) the n-th switching element 35. This leads to the resistance of $n*R_d$ in the serial circuit of the resistors 34, and thus a threshold voltage $V_{REF-1}$ corresponding to $a*(c/a)*((n+1)/n)$ is outputted from the threshold generator 22. Note that, in the case of n=z, no switching element 35 is instructed to be turned on. However, no problem arises because the z-th resistor 34 is being connected to the reference potential point (GND) through a connection.

As described above, the serial circuit of the resistors 34, the switching elements 35 and the decoder 36 form a variable resistor in which the resistance changes depending on the number n of switching power supplies PS in operation.

Meanwhile, in FIG. 3, a point of connection between the leftmost resistor 34 and the leftmost switching element 35 is referred to as Node 1. The serial circuit of the resistors 34 is a voltage divider which is formed, with a point of connection Node 1 as a connection point, of the resistor (the resistor at the left side of the point of connection Node 1) having a resistance Rd and the resistors (resistors at the right side of the point of connection Node 1) each having a resistance $(n-1)*R_d$. Accordingly, a threshold voltage $V_{REF-2}=a*(c/a)*((n-1)/n)$ can be outputted from the point of connection Node 1. (Greek letter alpha is replaced with A.)

The configuration of the threshold generators 22 and 24 is not limited to the one described above. For example, the threshold generators 22 and 24 may be configured as follows. Specifically, the switching elements 35 are respectively connected in parallel with the resistors 34 except the left-most resistor 34 in FIG. 3. When one of the switching elements 35 turns on, a short circuit occurs between the switching element 35 and the resistor 34 connected in parallel with each other. With this configuration, the outputs $V_{REF-1}$ and $V_{REF-2}$ from the threshold generators 22 and 24 can also be obtained with the resistance of $n*R_d$ in the serial circuit of the resistors 34, the outputs $V_{REF-1}$ and $V_{REF-2}$ respectively corresponding to $a*(c/a)*((n+1)/n)$ and $a*(c/a)*((n-1)/n)$.

As described above, the threshold generators 22 and 24 have a configuration as a non-inverting amplifier circuit. In addition, triggered by an operation of the switching elements 35 on the basis of the number n of switching power supplies PS in operation, the threshold generators 22 and 24 output the threshold voltages $V_{REF-1}$ and $V_{REF-2}$ respectively corresponding to $a*(c/a)*((n+1)/n)$ in the root in the aforementioned Equation (23) and $a*(c/a)*((n-1)/n)$ described above. (Greek letter alpha is replaced with A.)

A comparator 23 compares the voltage V with the threshold voltage $V_{REF-1}$, while a comparator 25 compares the voltage $V_{CUR}$ with the threshold voltage $V_{REF-2}$. Note that when n is the maximum value z, the threshold voltage $V_{REF-1}=a*(c/a)*((z+1)/z)$. If this value is larger than a value showing the maximum value in allowable load current of each of the z switching power supplies PS, the intersection current detection circuit 20 does not issue an instruction to increase n over the maximum value z. When the voltage $a*(c/a)*((z+1)/z)$ is smaller than the above-described value showing the maximum value, a voltage generator circuit and a multiplexer circuit are combined or the like so that when n=z, the threshold generator 22 inputs a very large value (for example, a value equal to or slightly lower than the supply voltage) as the threshold voltage $V_{REF-1}$ into an inverting input terminal of the comparator 23. This can satisfy the condition that the threshold voltage $V_{REF-1}$ is larger than the value showing the maximum value described above. Meanwhile, n=1 causes an inverting input terminal of the comparator 25 to have a zero potential (GND). Note that the coefficient a described above is set so that the comparators 23 and 25 can operate in a common-mode range (in-phase input voltage range). (Greek letter alpha is replaced with A.)

The changing processor 8 causes a memory 9 to store the number n of switching power supplies PS in parallel operation at the current time point and constantly receives the load current $i_m$ from the current sensor 6. When the voltage $V_{CUR}$ based on the load current $i_m$ reaches the reference voltage $V_{REF-1}$, the comparator 23 of the intersection current detection circuit 20 outputs a high-level signal "H." As is clear from the relationship shown by Equation (16), timing of outputting the signal "H" is timing at which the total load current $i_o$ reaches the threshold $i_{th\_n}$ expressed by Equation (22), which is timing at which the total load current $i_o$ reaches a value of a point of changing the number of switching power supplies PS in operation (from one to two) illustrated in FIG. 6.

The changing processor 8 includes a microprocessor. Based on the signal "H," the microprocessor executes processing of increasing the number of switching power supplies PS in operation from n to n+1, that is, processing of operating one of the switching power supplies PS not in operation at the current time point. This keeps the efficiency of the power supply system optimum.

In contrast, when the voltage $V_{CUR}$ based on the load current $i_m$ lowers to the threshold voltage $V_{REF-2}$, the changing processor 8 causes the comparator 25 to output a low-level signal "L." The timing at which the signal "L" is outputted is timing at which the total load current $i_o$ lowers to the value of the point of changing the number of switching power supplies PS in operation (from two to one) illustrated in FIG. 6.

At this timing, the microprocessor of the changing processor 8 executes, based on the signal "L," processing of decreasing the number of switching power supplies PS in operation from n to n−1, that is, processing of putting one of the switching power supplies PS in operation at the current time point into a non-operating state. This keeps the efficiency of the power supply system optimum.

Figure 7:
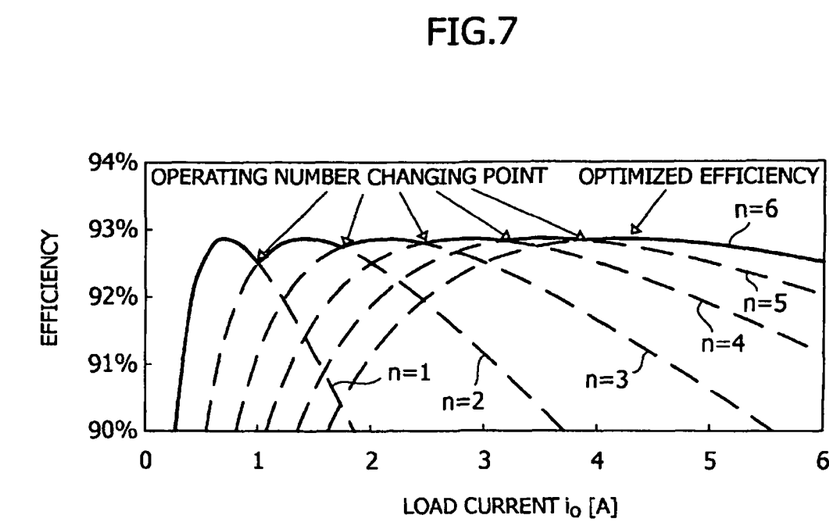
FIG. 7 is a graph illustrating points of changing the number of switching power supplies in operation and the optimization efficiency characteristics in a case of changing many times the number of switching power supplies in operation.

Therefore, the power supply system according to this embodiment changes the number of switching power supplies PS in operation in such a mode as shown in FIG. 7, and thus constantly operates at the optimum efficiency.

Here, a more detailed description is given of the thresholds for changing the number of switching power supplies PS in operation. The total load currents $i_o$ at the points of changing the number of switching power supplies PS in operation in FIG. 7 are intersection currents which are thresholds for changing the number of switching power supplies PS in operation. The intersection currents are denoted by $i_1$ to $i_{(z-1)}$. For example, an intersection current $i_1$ is a current of an intersection between a curve of n=1 and a curve of n=2 in FIG. 7, and an intersection current $i_{(z-1)}$ is a current of an intersection between a curve of n=z−1 and a curve of n=z in FIG. 7.

The threshold generator 22 shown in FIG. 3 generates a threshold for increasing the number of power supplies in operation $I_{jH}$ (j is a natural number from 2 to (z−1)), a threshold $i_{1H}=i_1$ for increasing the number of power supplies in operation, and the threshold generator 24 shown in FIG. 3 generates a threshold $i_{jL}$ for decreasing the number of power supplies in operation and a threshold $i_{zL}=i_{(z-1)}/z$ for decreasing the number of power supplies in operation. Note that a conversion coefficient of current/voltage is ignored for simplicity of the discussion. In FIG. 3, the reference voltage $V_{REF-1}$ corresponds to the threshold $i_{jH}$ for increasing the number of power supplies in operation and the threshold $i_{1H}=i_1$ for increasing the number of power supplies in operation, while the reference voltage $V_{REF-2}$ corresponds to the threshold $i_{jL}$ for decreasing the number of power supplies in operation and the threshold $i_{zL}=i(z-1)/z$ for decreasing the number of power supplies in operation. That is, each of these thresholds is generated as a threshold for the load current $i_m$ of the master switching power supply PS-1.

Here, for example, when j is 2, a threshold $i_{2L}$ for decreasing the number of power supplies in operation is a threshold for decreasing the number of power supplies in operation from 2 to 1, that is, $i_{2L}=i_{(2-1)}/2=i_1/2$. In contrast, a threshold $i_{2H}$ for increasing the number of power supplies in operation is a threshold for increasing the number of power supplies in operation from 1 to 2, that is, $i_{2H}=i_2/2$.

Note that a threshold $i_{1L}$ for decreasing the number of power supplies in operation does not exist, or is zero. In addition, a threshold $i_{zH}$ for increasing the number of power supplies in operation does not exist, or is a value exceeding the maximum value in the allowable load current of each of the z switching power supplies PS.

The present invention is not limited to the described embodiment, and various deformations, modifications and combinations such as the following may be made based on the technical idea of the present invention.

(a) For example, in the embodiment described above, the number of switching power supplies PS in operation is changed based on the load current $i_m$ of the switching power supply PS-1 as the master power supply. Instead of this, the number of switching power supplies PS in operation may be changed based on the total load current $i_o$.

In this case, the load current $i_m$ is not detected by the current sensor 6. Instead, the total load current $i_o$ is detected by a sensor 7. Then, the voltage generator 21 shown in FIG. 2 is configured to compute $a*i_o^2$ based on the load current $i_o$ detected by the current sensor 7 and then to generate a voltage $V_{CUR}$ corresponding to $a*i_o^2$. In contrast, the threshold generator 22 is configured to output a threshold voltage $V_{REF-1}$ corresponding to $a*(c/a)*n(n+1)$ in the root of Equation (22), and the threshold generator 24 is configured to output a threshold voltage $V_{REF-2}$ corresponding to $a*(c/a)*n(n-1)$ obtained by replacing n in $a*(c/a)*n(n+1)$ with n−1. Incidentally, when the current sensor 7 is used as described above, the current sensor 6 is not required. That is, when either the current sensor 6 or 7 is provided, the present invention can be carried out. (Greek letter alpha is replaced with A.)

(b) In the embodiment described above, when the total load current $i_o$ reaches the intersection current value (current value at which the number of switching power supplies PS in operation is changed), the reaching is detected by using the intersection current detection circuit 20 shown in FIG. 2. This is performed so as to reduce the burden of the microprocessor of the changing processor 8. Accordingly, when the changing processor 8 is provided with a microprocessor having a high processing capacity, the processing to be executed by the intersection current detection circuit 20 may be executed by the microprocessor.

In this case, the changing processor 8 is provided with an A/D converter which performs A/D conversion on the load current (the load current $i_m$ of the master switching power supply PS-1 or the total load current $i_o$ of the power supply system). In addition, a threshold for an output of the A/D converter (a threshold corresponding to the intersection current) is in advance stored in a memory 10 shown in FIG. 2. Then, the microprocessor compares the output of the A/D converter with the threshold for the current number n of switching power supplies PS in operation, the threshold being stored in the memory 10. Based on the comparison result, the microprocessor executes processing of increasing or decreasing the number of switching power supplies PS in operation so that the efficiency of the power supply system can be optimized.

(c) The embodiment described above is configured on the assumption that the load currents of the switching power supplies PS are balanced (when having the equal characteristic, the switching power supplies PS have the equal load current). Note that the control to balance the load currents of the switching power supplies PS is conventionally known as described above.

However, even though the control to balance the load currents is performed, the balance is not maintained immediately after the number of switching power supplies PS in operation are changed. In this respect, in a transient stage in which the number of switching power supplies PS is in operation, it is preferable to execute processing of gradually increasing the load current of a newly operating switching power supply PS (soft-start) while gradually decreasing the load currents of the other switching power supplies PS.

Furthermore, when the number of switching power supplies PS in operation is decreased, abrupt stopping of a switching power supply PS causes a certain amount of current not to be supplied to the load at the moment, the certain amount of current being equivalent to a current supplied by the switching power supply PS. Hence, it is preferable that the load current of a switching power supply PS to be stopped is gradually decreased while gradually increasing the load currents of the other switching power supplies PS. In this case, when the load current of the switching power supply PS to be stopped reaches zero, the changing of the number of switching power supplies PS is completed.

The processing as described above can be executed by known means, and thus, description thereof is omitted herein. Note that the processing is executed at the changing processor 8.

(d) Immediately after the number of switching power supplies PS in operation is changed, the power supply system is not in a steady state but is in a transient state. This means that, if subsequent processing of changing the number of switching power supplies PS in operation is allowed while the number of switching power supplies PS in operation is being changed, a current in a transient state is detected. This might cause a problem in an error in the processing of changing the number of power supplies PS in operation. In particular, in a case in which the change of the number is judged based not on the total load current $i_o$ but on the load current $i_m$ of the master switching power supply PS-1, there is a higher possibility of occurrence of the above problem. This is because, immediately after the number of switching power supplies PS in operation is changed, the value of the load current $i_m$ stays around a current threshold to be compared with the load current $i_m$.

The trouble can be avoided by providing a maximum hysteresis error to the threshold (showing an intersection current) to be compared with a value showing the total load current $i_o$ or the load current $i_m$ of the master switching power supply PS-1, the threshold being compared to determine the number of the switching power supplies PS in operation.

The problem described above can also be avoided by prohibiting processing of changing the number of switching power supplies PS in operation for a predetermined time after the number of switching power supplies PS in operation is changed.

Note that combination may be employed that the maximum hysteresis error is provided to the threshold and the processing of changing the number of switching power supplies PS in operation is prohibited for a predetermined time after the number of switching power supplies PS in operation is changed.

In addition, the changing processor 8 may be provided with means for providing the maximum hysteresis error to the threshold or means for prohibiting the process of changing the number of switching power supplies PS in operation for a predetermined time.

(e) The embodiment described above is configured on the assumption that the characteristics of the switching power supplies PS are equal to each other, or can be considered to be equal to each other. However, the present invention can be carried out even in a case in which the characteristics of the switching power supplies PS are not equal to each other. Specifically, when the characteristics of the switching power supplies PS are not equal to each other, an approximate expression of the aforementioned Expression (15) expressing the efficiency of a switching power supply PS, or a (generalized) convex function including a higher-order term obtained in consideration of an influence of a parasitic element is logically or experimentally obtained for all the switching power supplies PS. Then, a graph corresponding to the graph illustrated in FIG. 7 is created by numerical calculations based on the expressions expressing the efficiencies. Subsequently, values of total load currents $i_o$ at intersections of individual efficiency curves in the graph are stored, as judgment thresholds for changing the number of switching power supplies PS in operation, in the memory 10 shown in FIG. 1. Note that processing of changing the number of switching power supplies PS in operation using the judgment thresholds is the same as the one in the aforementioned embodiment, and thus, description thereof is omitted.

(f) The embodiment described above uses the step-down type switching power supply PS as a power supply. However, the present invention is applicable to other various switching power supplies of a boosting type, boosting and step-down type, inverting type, and the like.

(g) When the number of power supplies PS in operation is changed using digital control, the aforementioned algorithm is stored in a storage means, and a controller executing the algorithm is provided with means for inputting data showing the characteristics of the switching power supplies PS (for example, the total number of the switching power supplies PS and constants a, b and c in Expression (15)). Thereby, the present invention can be flexibly applied to the various switching power supplies described above.

REFERENCE SYMBOLS LIST 1, 2 MOSFET
3 controller
4 inductor
5 capacitor
6, 7 current sensor
8 changing processor
9, 10 memory
20 intersection current detector
21 voltage generator
22, 24 threshold generator
23, 25 comparator
31 operational amplifier
32 direct current source
33, 34 resistor
35 switching element
36 decoder

The invention claimed is:

1. A power supply system comprising:
z power supplies connected in parallel, z being a natural number equal to or larger than 2; and
an operating number controller which controls the number of the power supplies in operation,
wherein the operating number controller determines the number of the power supplies in operation based on intersection currents $i_1$ to $i_{(z-1)}$ and the intersection currents $i_1$ to $i_{(z-1)}$ are determined by:
identifying loss characteristics with respect to the z power supplies by use of convex functions f1 to fz, respectively;
obtaining a function $\eta_n$ expressing a conversion efficiency of a total load current at the time of operating n power supplies based on the functions f1 to fz, n being a natural number equal to or smaller than z; and
obtaining an intersection current $i_q$, $i_q$ being a current of an intersection point between a function $\eta_q$ and a function $\eta_{(q+1)}$ and q being a natural number equal to or smaller than (z−1),
wherein all of the convex functions f1 to fz are substantially equal to a single quadratic polynomial with respect to the load current, and
wherein the operating number controller comprises:
a number storage element which stores the number n of the power supplies in operation;
a current detection element which detects a load current of one of the power supplies in operation;

a square element which squares an output signal of the current detection element; and threshold generation elements which respectively give a threshold $V_{thL}=K*((n-1)/n)$ for decreasing the number of power supplies in operation (K is a positive constant) and a threshold $V_{thH}=K*((n+1)/n)$ for increasing the number of power supplies in operation, and the operating number controller decreases or increases the number n of the power supplies in operation by comparing the output of the square element with a threshold $V_{thL}$ or a threshold $V_{thH}$.

2. The power supply system according to claim 1, wherein the operating number controller comprises:
an intersection-current-value storage element which saves the intersection currents $i_1$ to $i_{(z-1)}$; and
a current detection element which detects the total load current, and
wherein the operating number controller determines the number of the power supplies in operation by comparing a total load current detected by the current detection element with a corresponding one of the intersection currents $i_1$ to $i_{(z-1)}$ saved in the intersection-current-value storage element.

3. The power supply system according to claim 2, wherein the operating number controller determines the number of power supplies in operation as: 1 in a case of $i<i_1$; q+1 in a case of $i_q<i\leq i_{(q+1)}$; or z in a case of $i_{(z-1)}<i$, or determines the number of power supplies in operation as: 1 in a case of $i\leq i_1$; q+1 in a case of $i_q\leq i<i_{(q+1)}$; or z in a case of $i_{(z-1)}\leq i$, where i denotes the total load current detected by the current detection element.

4. The power supply system according to claim 1, wherein the operating number controller comprises:
a threshold generation element which outputs, based on a corresponding one of the intersection currents $i_1$ to $i_{(z-1)}$, a threshold $i_{jL}=i_{(j-1)}/j$ for decreasing the number of power supplies in operation (j is a natural number of 2 to (z-1)), a threshold $i_{jH}=i_j/j$ for increasing the number of power supplies in operation, a threshold $i_{1H}=i_1$ for increasing the number of power supplies in operation or a threshold $i_{zL}=i_{(z-1)}/z$ for decreasing the number of power supplies in operation (provided that $i_{1L}$ does not exist or is zero, and $i_{zH}$ does not exist or is a value exceeding a maximum value in each of allowable load currents of the z power supplies);
a number storage element which stores the number n of the power supplies in operation; and
a current detection element which detects a load current of one of the power supplies in operation,
wherein the operating number controller compares a value of the load current detected by the current detection element with the threshold $i_{nL}$ or $i_{nH}$, and
wherein when the value of the load current detected by the current detection element is equal to or lower than the threshold $i_{nL}$, the operating number controller changes the number of the power supplies in operation to (n-1), or when the load current detected by the current detection element is equal to or higher than the threshold $i_{nH}$, the operating number controller changes the number of the power supplies in operation to (n+1).

5. The power supply system according to claim 4, wherein the convex functions f1 to fz are each substantially equal to a single quadratic equation, $P_L=ai_m^2+bi_m+c$, where $P_L$ denotes a loss of a load current $i_m$ of a power supply, and a, b and c are constants, and wherein the threshold $i_{nL}$ is obtained by replacing z in the following expression with z=(n-1), and the threshold $i_{nH}$ is obtained by replacing z in the following expression with z=(n+1), $$\sqrt{\frac{c}{a}\frac{z}{n}}.$$

6. The power supply system according to claim 1, wherein the convex functions f1 to fz are each an even-ordered polynomial with respect to the total load current.

7. The power supply system according to claim 1, wherein the threshold generation elements comprise non-inverting amplifier circuits each including:
an operational amplifier;
a constant voltage source which applies a constant voltage to a non-inverting input terminal of the operational amplifier;
a fixed resistor which is connected between an output terminal of the operational amplifier and an inverting input terminal thereof and which has a resistance Rd; and
a variable resistor circuit which is connected between the inverting input terminal of the operational amplifier and a reference potential point and which changes a resistance based on the number n of power supplies in operation, and
wherein in each of the non-inverting amplifier circuits, the variable resistor circuit is formed as a serial circuit including a resistor which has one end connected to the output terminal of the operational amplifier and which has a resistance Rd and resistors which have a resistance (n-1)*Rd based on the number n of power supplies in operation, the threshold $V_{thH}$ for increasing the number of power supplies in operation is outputted from the output terminal of the operational amplifier, and a potential at a connection point between the resistor having the resistance Rd and the resistors having the resistance (n-1)*Rd is outputted as the threshold $V_{thL}$ for decreasing the number of power supplies in operation.

8. The power supply system according to claim 7, wherein the variable resistor circuit of each of the non-inverting amplifier circuits comprises:
z resistors connected in series between the inverting input terminal of the operational amplifier and the reference potential point and which have a resistance Rd;
(z-1) switching elements which change the number of the resistors connected in series in the serial circuit having the z resistors; and
a decoder which controls turning-on and turning-off of the (z-1) switching elements on a basis of the number n of power supplies in operation, thereby forming the serial circuit including the resistor having the resistance Rd and the resistors having the resistance (n-1)*Rd.

9. The power supply system according to claim 1, wherein, in order to determine the number of the power supplies in operation, the operating number controller provides a maximum hysteresis error to the intersection currents or the thresholds based on the intersection currents.

10. The power supply system according to claim 1, wherein the operating number controller prohibits changing of the number of the power supplies in operation for a predetermined time after the number of the power supplies in operation is changed.

11. The power supply system according to claim 1, wherein the power supplies are step-down type switching power supplies.

12. A controller in a power supply system comprising:
z power supplies connected in parallel, z being a natural number equal to or larger than 2,
wherein the controller is configured to determine the number of the power supplies in operation based on values of intersection currents $i_1$ to $i_{(z-1)}$, the intersection currents $i_1$ to $i_{(z-1)}$ being determined by:
identifying loss characteristics with respect to load currents of the z power supplies by use of respective convex functions f1 to fz;
obtaining a function $\eta_n$ expressing a conversion efficiency of a total load current at the time of operating the n power supplies based on the functions f1 to fz, n being a natural number equal to or smaller than z; and
obtaining an intersection current $i_q$, $i_q$ being a current of an intersection point between a function $\eta_q$ and a function $\eta_{(q+1)}$ and q being a natural number equal to or smaller than (z−1),
wherein all of the convex functions f1 to fz are substantially equal to a single quadratic polynomial with respect to the load current, and
wherein the controller comprises:
a number storage element which stores the number n of the power supplies in operation;
a current detection element which detects a load current of one of the power supplies in operation and outputs a voltage signal corresponding to the load current;
a square element which squares the output signal of the current detection element; and
threshold generation elements which respectively give a threshold $V_{thL}=K*((n-1)/n)$ for decreasing the number of power supplies in operation (K is a positive constant) and a threshold $V_{thH}=K*((n+1)/n)$ for increasing the number of power supplies in operation, and
the controller decreases or increases the number n of the power supplies in operation by comparing the output of the square element with a threshold $V_{thL}$ or a threshold $V_{thH}$.

13. The controller of the power supply system according to claim 12,
wherein the controller comprises:
an intersection-current-value storage element which saves the values of the intersection currents $i_1$ to $i_{(z-1)}$; and
a current detection element which detects the total load current, and
wherein the controller determines the number of the power supplies in operation by comparing a total load current detected by the current detection element with a corresponding one of the intersection currents $i_1$ to $i_{(z-1)}$ saved in the intersection-current-value storage element.

14. The controller of the power supply system according to claim 13, wherein the operating number controller determines the number of power supplies in operation as: 1 in a case of $i<i_1$; q+1 in a case of $i_q<i\le i_{(q+1)}$; or z in a case of $i_{(z-1)}<i$, or determines the number of power supplies in operation as: 1 in a case of $i\le i_1$; q+1 in a case of $i_q\le i<i_{(q+1)}$; or z in a case of $i_{(z-1)}\le i$, where i denotes the total load current detected by the current detection element.

15. The controller of the power supply system according to claim 12,
wherein the controller comprises:
a threshold generation element which outputs, based on a corresponding one of the intersection currents $i_1$ to $i_{(z-1)}$, a threshold $i_{jL}=i_{(j-1)}/j$ for decreasing the number of power supplies in operation (j is a natural number of 2 to (z−1)), a threshold $i_{jH}=i_j/j$ for increasing the number of power supplies in operation, a threshold $i_{1H}=i_1$ for increasing the number of power supplies in operation or a threshold $i_{zL}=i_{(z-1)}/z$ for decreasing the number of power supplies in operation (provided that $i_{1L}$ does not exist or is zero, and $i_{zH}$ does not exist or is a value exceeding a maximum value in each of allowable load currents of the z power supplies);
a number storage element which stores the number n of the power supplies in operation; and
a current detection element which detects a load current of one of the power supplies in operation,
wherein the controller compares a value of the load current detected by the current detection element with the threshold $i_{nL}$ or $i_{nH}$, and
wherein when the value of the load current detected by the current detection element is equal to or lower than the threshold $i_{nL}$, the controller changes the number of the power supplies in operation to (n−1), or when the load current detected by the current detection element is equal to or higher than the threshold $i_{nH}$, the controller changes the number of the power supplies in operation to (n+1).

16. The controller of the power supply system according to claim 12, wherein the convex functions f1 to fz are each an even-ordered polynomial with respect to the total load current.

17. The controller of the power supply system according to claim 16,
wherein the convex functions f1 to fz are each substantially equal to a single quadratic equation, $P_L=ai_m^2+bi_m+c$, where $P_L$ denotes a loss of a load current $i_m$ of a power supply, and a, b and c are constants, and
wherein the threshold $i_{nL}$ is obtained by replacing z in the following expression with z=(n−1), and the threshold $i_{nH}$ is obtained by replacing z in the following expression with z=(n+1), $$\sqrt{\frac{c}{a}\frac{z}{n}}.$$

18. The controller of the power supply system according to claim 12,
wherein the threshold generation elements comprise non-inverting amplifier circuits each including:
an operational amplifier;
a constant voltage source which applies a constant voltage to a non-inverting input terminal of the operational amplifier;
a fixed resistor which is connected between an output terminal of the operational amplifier and an inverting input terminal thereof and which has a resistance Rd; and
a variable resistor circuit which is connected between the inverting input terminal of the operational amplifier and a reference potential point and which changes a resistance based on the number n of power supplies in operation, and
wherein in each of the non-inverting amplifier circuits, the variable resistor circuit is formed as a serial circuit including a resistor which has one end connected to the output terminal of the operational amplifier and which has a resistance Rd and resistors which have a resistance (n−1)*Rd based on the number n of power supplies in operation, the threshold $V_{thH}$ for increasing the number of power supplies in operation is outputted from the output terminal of the operational amplifier, and a potential at a connection point between the resistor having the resistance Rd and the resistors having the resistance (n−1)*Rd is outputted as the threshold $V_{thL}$ for decreasing the number of power supplies in operation.

19. The controller of the power supply system according to claim 18, wherein the variable resistor circuit of each of the non-inverting amplifier circuits comprises:
   z resistors connected in series between the inverting input terminal of the operational amplifier and the reference potential point and which have a resistance Rd;
   (z−1) switching elements which change the number of the resistors connected in series in the serial circuit having the z resistors; and
   a decoder which controls turning-on and turning-off of the (z−1) switching elements on a basis of the number n of power supplies in operation, thereby forming the serial circuit including the resistor having the resistance Rd and the resistors having the resistance (n−1)*Rd.

20. The controller of the power supply system according to claim 12, wherein, in order to determine the number of the power supplies in operation, the controller provides a maximum hysteresis error to the intersection currents or the thresholds based on the intersection currents.

21. The controller of the power supply system according to claim 12, wherein the controller prohibits changing of the number of the power supplies in operation for a predetermined time after the number of the power supplies in operation is changed.

22. The controller of the power supply system according to claim 12, wherein the power supplies are step-down type switching power supplies.

* * * * *